Oct. 28, 1930.  J. E. ESHBAUGH  1,779,840
OXYGEN REGULATOR
Filed April 5, 1927
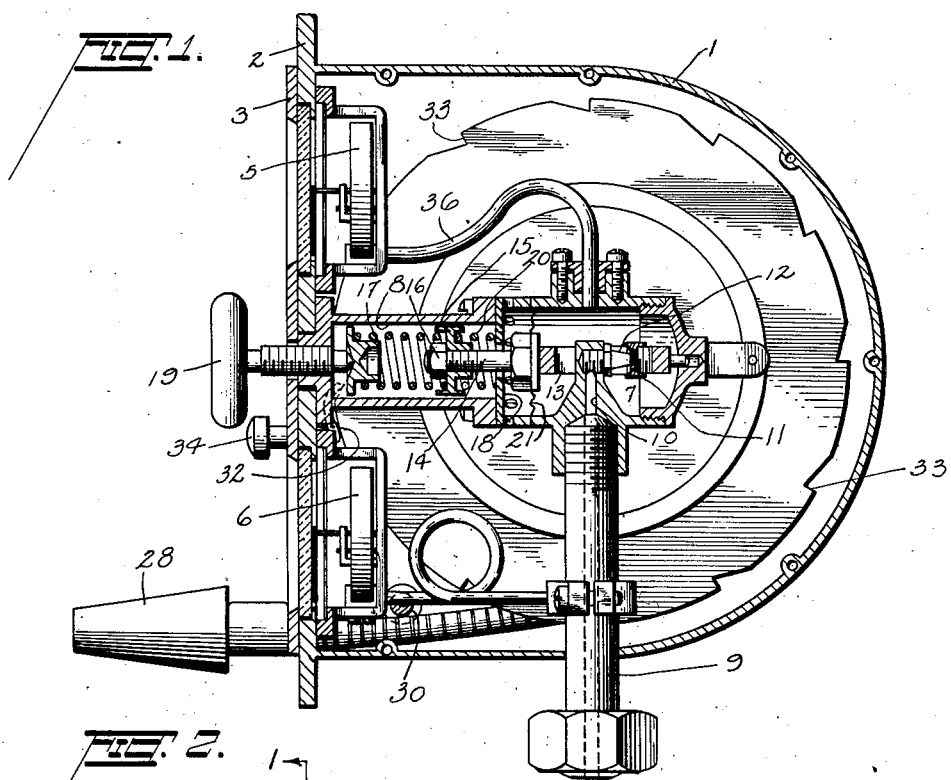
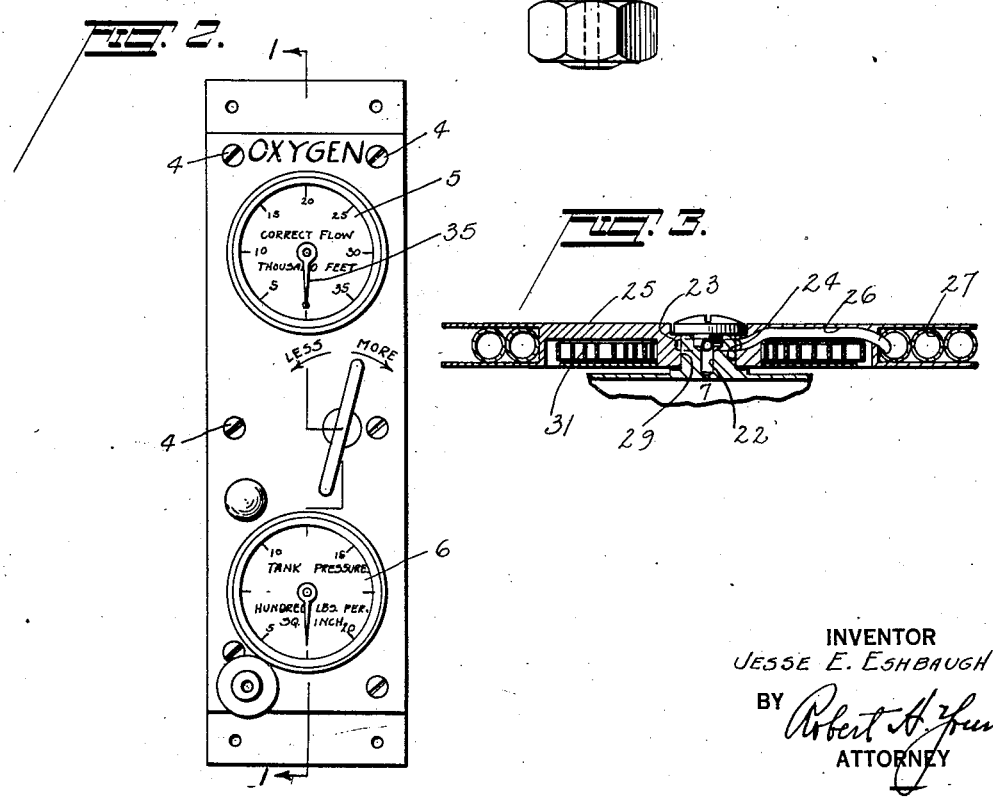
INVENTOR
JESSE E. ESHBAUGH
BY
ATTORNEY Patented Oct. 28, 1930

1,779,840

UNITED STATES PATENT OFFICE

JESSE EVERETT ESHBAUGH, OF FLINT, MICHIGAN

OXYGEN REGULATOR

Application filed April 5, 1927. Serial No. 181,250.

This invention relates to an apparatus for regulating the flow of oxygen to a pilot of an aircraft while flying at high altitudes.

Present day developments in aircraft call for considerable flying at altitudes ranging from 10,000 to 30,000 feet, depending upon the type of craft flown. Considerable difficulty in breathing normally is experienced at these altitudes and becomes more apparent the higher the aircraft is flown. As a result therefore of such a necessity arising, it is important that means be provided whereby life can be sustained at high altitude flying.

The main object of this invention is the provision of a regulating apparatus, connected to an oxygen supply source and mounted within the cockpit of an airplane, preferably on the instrument board thereof, so as to be easily accessible to the pilot when occasion arises for the use of the same.

A second object is the provision of an indicating means for giving indications of the amount of oxygen remaining in the source of supply, together with other means, showing the amount of oxygen being used and the rate of flow thereof.

A further object of the invention is the adoption of the component parts of the device to be hereinafter described to the vertical dial type of instrument.

Other objects will be apparent in the construction and novel combination and arrangement of parts hereinafter described, illustrated in the accompanying drawing and pointed out in the claim hereunto appended, in which:

Fig. 1 is a sectional view taken on the line 1—1 of Fig. 2, showing the arrangement of the various parts of the regulator.

Fig. 2 is a front view thereof showing the arrangement of the indicator and the valve controlling mechanism.

Fig. 3 is a partial section of the drum and parts attached as shown in Fig. 1.

Referring to the drawing, the regulator comprises generally, a casing 1 of a substantially flat and compact structure, having a flanged portion 2 at its front end, as shown in Fig. 1. A plate 3 is mounted on the flanged portion by means of screws 4 and serves as a mounting plate for the indicators 5 and 6, the function of which will be described later. A pressure regulating chamber 7 comprising a hollow flanged passage 8 is fixedly mounted to the flanged portion 2 of the casing as shown in Fig. 1. Gaseous oxygen from a supply source (not shown), enters the regulator through the tube 9 screwed into the bottom of the pressure chamber 7. A passage 10 is connected at its one end to the tube 9 and to the valve seat 11 and valve 12 at its other end.

Valve 12 is integral with a spanner 13, provided with a threaded rod 14 and is held in position by a nut 16. A spring 17, under tension, bears against the face of the disc 15 at its one end and against the flange 18 of the chamber 7 at its other end to keep the valve 12 normally closed. As a result the oxygen is prevented from further passage through the regulator. A thumb screw 19 is mounted for manual adjustment by the pilot in the front of the regulator and compresses a main spring 17 which in turn compresses the valve spring 20, lifts the valve 11 from the valve seat 12 and permits oxygen to enter pressure chamber 7. This chamber has a diaphragm 21, suspended at its one end which is supported for fore and aft movement by the spanner 13.

With oxygen pouring into the chamber 7 the pressure therein increases until the force acting upon the diaphragm 21 is sufficient to counterbalance the action of the springs 17 and 20. With the pressure in the chamber greater than the action of the spring, the valve 12 will close. Therefore, a certain predetermined pressure is obtainable in the chamber 7 for a given setting of the thumb screw 19 and the farther the springs are compressed the greater will be the pressure built up in the chamber. The oxygen escapes from chamber 7 through an orifice 22 as shown in Fig. 3, into an annular space 23 provided in the inner bearing wall 24 of drum 25. Passing through this space the oxygen escapes through a passage 26, as shown in Fig. 3, into a flexible steel jacketed tube 27, through tubular mouthpiece 28 and to the pilot.

The drum 25 is mounted for rotational movement upon a stub shaft 29 of the chamber 7 and is grooved, as shown in Fig. 3 to receive a considerable length of the tube 27. When in use a suitable length of tubing is pulled out of the regulator over rollers 30 against the action of a coiled spring 31, coacting with the drum 25 to keep the same normally from rotating. A pawl 32, substantially located in front of the regulator engages a series of notches 33 located on the periphery of the drum 25 and prevents the tube from being drawn into the regulator by the spring action from the drum.

When the tube is no longer needed, a button 34 conveniently located upon the front of the regulator and in engagement with the pawl 32 is pressed inwardly, releases the pawl and permits the tubing to be rewound on the drum. A flow indicator 5, previously mentioned, and which is essentially a pressure gauge is mounted on the front panel of the regulator and at one end thereof. This gauge is connected to the pressure chamber by a small tube 36 and is calibrated in units of altitude and represents the pressure required in chamber 7, in order that the quantity of oxygen escaping to the user is sufficient for his needs at the altitude indicated by the pointer 35 on the gauge 5. A pressure gauge 6 is connected by suitable means to the inlet passage 9 which is in direct communication with the supply cylinder and regulates the pressure in the same at all times.

I claim:

In a device of the class described, comprising a casing having a mounting plate, a pressure reducing valve therein, said valve being provided with an intake and exhaust opening, a drum mounted for rotatable movement upon said valve, a hose mounted on said drum having one end in communication with said valve and the other end supported by said mounting plate whereby fluid in said valve is delivered at a point remote therefrom, a pressure gage communicating with said valve, and pressure indicating means communicating with the source of pressure, said pressure gage and said indicating means being disposed one above the other within said mounting plate.

In testimony whereof I affix my signature.

JESSE E. ESHBAUGH.